United States Patent
Pilz et al.

(10) Patent No.: US 7,692,336 B2
(45) Date of Patent: Apr. 6, 2010

(54) METHOD FOR PREDICTING A FUTURE VOLTAGE AND/OR CURRENT CURVE

(75) Inventors: Georg Pilz, Dresden (DE); Peter Schegner, Dresden (DE)

(73) Assignee: Siemens Aktiengesellschaft, Munich (DE)

( * ) Notice: Subject to any disclaimer, the term of this patent is extended or adjusted under 35 U.S.C. 154(b) by 632 days.

(21) Appl. No.: 10/498,098

(22) PCT Filed: Dec. 10, 2002

(86) PCT No.: PCT/DE02/04573

§ 371 (c)(1),
(2), (4) Date: Jun. 10, 2004

(87) PCT Pub. No.: WO03/050831

PCT Pub. Date: Jun. 19, 2003

(65) Prior Publication Data

US 2005/0013080 A1 Jan. 20, 2005

(30) Foreign Application Priority Data

Dec. 12, 2001 (DE) ................. 101 62 118

(51) Int. Cl.
*H01H 47/02* (2006.01)

(52) U.S. Cl. ........................................ 307/96
(58) Field of Classification Search ............. 307/96
See application file for complete search history.

(56) References Cited

U.S. PATENT DOCUMENTS 5,652,827 A * 7/1997 Prammer .................... 704/203
5,703,791 A 12/1997 Amano et al.

FOREIGN PATENT DOCUMENTS

| DE | 41 29 261 C1 | 10/1992 |
|---|---|---|
| EP | 1006538 A1 * | 6/2000 |
| JP | 02055528 A | 2/1990 |
| JP | 2-101929 | 4/1990 |
| JP | 7-284231 | 10/1995 |

(Continued)

OTHER PUBLICATIONS

Osborne et al: "A Modified Prony Algorithm for Fitting Functions Defined by Difference Equations", SIAM Journal of Scientific and Statistical Computing, vol. 12, pp. 362-382, Jan. 21, 1990.

(Continued)

*Primary Examiner*—Fritz M Fleming
*Assistant Examiner*—Dru M Parries
(74) *Attorney, Agent, or Firm*—Laurence A. Greenberg; Werner H. Stemer; Ralph E. Locher

(57) ABSTRACT

According to the invention, a controlled or synchronous switching of an electrical power breaker (1) can be guaranteed by means of predicting a future voltage and/or current curve from actual voltage and/or current data in an electrical energy network (5). The prediction of the future voltage and/or current curve is carried out using the voltage and/or current data determined in the electrical network (5) at different timepoints by application of a Prony method to the available voltage and/or current data.

2 Claims, 1 Drawing Sheet

FOREIGN PATENT DOCUMENTS

| | | |
|---|---|---|
| JP | 11-178213 | 7/1999 |
| JP | 2000-333373 | 11/2000 |

OTHER PUBLICATIONS

Hong et al: "A Time-Domain Approach to Transmission Network Equivalents Via Prony Analysis for Electromagnetic Transients Analysis", IEEE Transactions on Power Systems, vol. 10, pp. 1789-1797, 1995.

Amano et al.: "Self-Testing and Self-Tuning of Power System Stabilizers Using Prony Analysis", pp. 655-660, IEEE 1998.

Lobos et al.: "Analysis of Power System Transients Using Wavelets and Prony Method", Power Tech Proceedings, Sep. 2001.

* cited by examiner

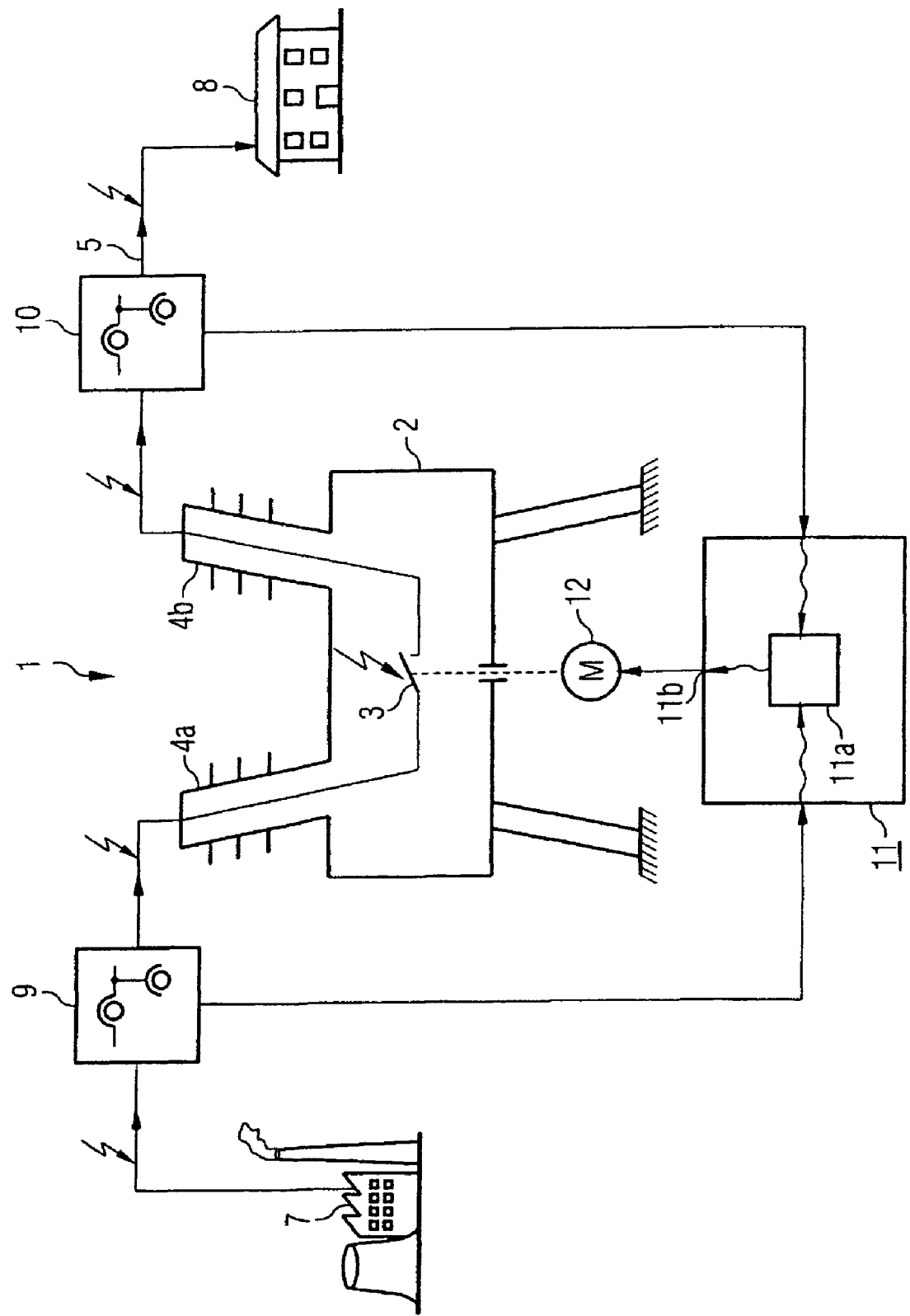

METHOD FOR PREDICTING A FUTURE VOLTAGE AND/OR CURRENT CURVE

CLAIM FOR PRIORITY

This application claims priority to International Application No. PCT/DE02/04573 which was published in the German language on Jun. 19, 2003, which claims the benefit of priority to German Application No. 101 62 118.3, which was filed in German language on Dec. 12, 2001.

TECHNICAL FIELD OF THE INVENTION

The invention relates to a system and method for determination of a future voltage and/or current waveform in an electrical power supply system.

BACKGROUND OF THE INVENTION

In electrical power supply systems, in particular power supply systems for the transmission of electrical power whose voltage changes periodically and in which the current flowing through the power supply system changes periodically, it is desirable to be able to predict future voltage and/or current waveforms. During undisturbed operation, the voltage and the current oscillate periodically at a constant frequency, with a constant amplitude, about a defined zero position. A phase shift can occur between the phase angle of the voltage and the phase angle of the current as result of electrical systems being connected to an electrical power supply system. Depending on the electrical systems which are connected, different phase shifts occur between the current and the voltage. In addition, voltage spikes and changes in the periodicity of the current and voltage or else transient processes can occur as a result of unpredictable events, such as switching overvoltages, which are produced when switching processes take place in the electrical power supply system, or else lightning strikes on the electrical power supply system. For certain applications, it is necessary, even in the case of waveforms which differ to a major extent from the fundamental oscillation, to determine in advance the actual waveform of the current and voltage in the electrical power supply system, in terms of the phase angles, in particular the zero crossings, as well as their amplitudes.

Fourier transformations are used, for example, in order to predict the current and/or voltage waveform in an electrical power supply system. Fourier transformations are used in an attempt to model the voltage and current waveforms which actually occur in the electrical power supply system by means of a large number of known functions that are superimposed on one another, and this is used to predict the future waveform of the voltage or of the current in an electrical power supply system. The calculations that are required for this purpose are associated with a quite considerable time requirement even when using the very latest computer technology.

Patent Abstract of Japan, JP 2055528, discloses the use of measured information to determine a future system voltage.

It is also known for a Prony method to be used to determine power supply system equivalents (Hong, J.-H, Park, J.-K., "A Time-Domain Approach To Transmission Network Equivalents Via Prony Analysis For Electromagnetic Transients Analysis". IEEE Transactions on Power Systems, Vol. 10, 1995, No. 4, pages 1789-1797). According to Amano, M., Watanabe, M., Banjo, M., "Self-Testing And Self-Tuning Of Power System Stabilizers Using Prony Analysis", Power Engineering Society 1999 Winter Meeting, ISBN 0-7803-4893-1, pages 655-660, it is known for the Prony method to be used for the configuration of regulators.

According to Lobos, T., Rezmer, J., Koglin, H.-J., "Analysis of Power System Transients Using Wavelets and Prony Method", Power Tech Proceeding, September. 2001, ISBN 0-7803-7139-9, it is known for a comparison to be carried out between the Prony method and the Fourier analysis.

SUMMARY OF THE INVENTION

The present invention is based on taking account of the Prony method for controlling an electrical switch.

Specifically, the invention relates to a system and method for determination of a future voltage and/or current waveform in an electrical power supply system, in which present voltage and/or current data are/is determined at various times in the electrical power supply system, and the determined voltage and/or current data are/is processed by means of a Prony method, and the future voltage and/or current waveform is determined on the basis of the processed voltage and/or current data.

In one embodiment of the invention, there is a switching time for an electrical switch, in particular a circuit breaker is determined on the basis of the processed voltage and/or current data and the determined future voltage and/or current waveform, and by an apparatus for carrying out this method.

Circuit breakers are also able to disconnect fault currents such as short-circuit currents. Fault processes such as these often result in voltage and/or current waveforms which differ to a major extent from the fundamental oscillation. Since a powerful arc is extinguished at its current zero crossing, it is necessary to disconnect a circuit breaker as far as possible immediately before or accurately at the current zero crossing, in order to minimize the occurrence of switching arcs. The time at which, for example, the contact pieces of a circuit breaker separate is defined as the switching time.

The Prony method is suitable to provide controlled switching in a particular manner since, in comparison to Fourier transformation, the sampling time for the available voltage and/or current data is not dependent on the fundamental oscillation to be expected. Furthermore, when using the Prony method, the phase shift and the damping of the individual frequency components can be recorded as required. In order to use the Prony method, available voltage and/or current data must first of all be determined at various times in the electrical power supply system. This is based on N complex data points x[1], ... x[N] of any desired sinusoidal or exponentially damped event. These data points must be equidistant data points. This sampled process can be described by a summation of p exponential functions:

$$y[n] = \sum_{k=1}^{p} A_k \exp[(\alpha_k + j2\pi f_k)(n-1)T + j\theta_k], \quad (2.1)$$

where
  T=sampling period in s
  $A_k$=amplitude of the complex exponent
  $\alpha_k$=damping factor in sal
  $f_k$=frequency of the sinusoidal oscillation in Hz
  $\theta_k$=phase shift in radians In the case of an actually sampled waveform, the complex exponents are subdivided into complex-conjugate pairs with the same amplitude. This reduces equation (2.1)

$$y[n] = \sum_{k=1}^{\frac{p}{2}} 2A_k \exp[\alpha_k(n-1)T]\cos[2\pi f_k(n-1)T + \theta_k] \quad (2.2)$$

for $1 \leq n \leq N$. If there are an even number of exponential functions p, then there are p/2 damped cosine functions. If the number is odd, then there are (p−1)/2 damped cosine functions and a very weak damped exponential function.

A simpler representation of equation (2.1) is obtained by combination of parameters into time-dependent and time-independent parameters.

$$y[n] = \sum_{k=1}^{p} h_k z_k^{n-1} \quad (2.3)$$

$$h_k = A_k \exp(j\theta_k) \quad (2.4)$$

$$z_k = \exp[(\alpha_k + j2\pi f_k)T] \quad (2.5)$$

The parameter $h_k$ is the complex amplitude and represents a time-independent constant. The complex exponent $z_k$ is a time-dependent parameter.

In order to make it possible to model an actual process with the aid of a summation, it is necessary to minimize the mean square error $\rho$ over N sampled data points.

$$\rho = \sum_{n=1}^{N} |\varepsilon[n]|^2 \quad (2.6)$$

$$\varepsilon[n] = x[n] - y[n] = x[n] - \sum_{k=1}^{p} h_k z_k^{n-1} \quad (2.7)$$

This minimization process is carried out taking into account the parameters $h_k$, $z_k$ and p. This leads to a difficult non-linear problem, even if the number p of exponential functions is known [see Marple, Lawrence: Digital Spectral Analysis. London: Prentice-Hall International, 1987]. One possibility would be to use an iterative solution method (Newton method). However, this would be dependent on large computation capacities, since it is often necessary to invert matrices which are generally larger than the number of data points. The Prony method, which uses linear equations for solution purposes, is used to solve this problem in an efficient manner. In this method, the non-linear aspect of the exponential functions is taken into account with the aid of a polynomial factorization process. Fast solution algorithms exist for this type of factorization process.

The Prony Method:

For the approximation of a waveform, it is necessary to record a sufficient number of data points in order to define the parameters unambiguously. This means that at least $x[1], \ldots, x[2p]$ complex data points are in each case required.

$$x[n] = \sum_{k=1}^{p} h_k z_k^{n-1}. \quad (2.8)$$

It should be noted that x[n] was used instead of y[n]. This is because exactly 2p complex data points are required, which correspond to the exponential model with the 2p complex parameters $h_k$ and $z_k$. This relationship is expressed in equation (2.6) by minimizing the square error.

Equation (2.8) defines the aim of the Prony algorithm. A more detailed representation of the equation for $1 \leq n \leq p$ is given in equation (2.9).

$$\begin{pmatrix} z_1^0 & z_2^0 & \cdots & z_p^0 \\ z_1^1 & z_2^1 & \cdots & z_p^1 \\ \vdots & \vdots & \ddots & \vdots \\ z_1^{p-1} & z_2^{p-1} & \cdots & z_p^{p-1} \end{pmatrix} \begin{pmatrix} h_1 \\ h_2 \\ \vdots \\ h_p \end{pmatrix} = \begin{pmatrix} x[1] \\ x[2] \\ \vdots \\ x[p] \end{pmatrix} \quad (2.9)$$

Knowledge of the element z within the matrix would result in a number of linear equations, which can be used to calculate the complex amplitude vector h.

The solution method is based on equation (2.8) being the solution of a homogeneous linear differential equation having constant coefficients. In order to find the corresponding equation for the solution, a polynomial $\phi(z)$ of degree p is first of all defined.

$$\phi_p(z) = a[0]z^p + a[1]z^{p-1} + \ldots + a[p-1]z + a[p] \quad (2.10)$$

The parameter z to be determined indicates the zero points in the polynomial.

Representation of the polynomial as a summation is achieved with the aid of the algebra fundamental law (equation 2.11). The coefficient a[m] is complex, and a[0] is defined to be equal to unity.

$$\phi_p(z) = \sum_{m=0}^{p} a[m] z^{p-m} \quad (2.11)$$

A shift in the indices in equation (2.8) from n to n−m and multiplication by the parameter a[m] results in the following expression:

$$a[m]x[n-m] = a[m] \sum_{k=1}^{p} h_k z_k^{n-m-1} \quad (2.12)$$

If simple products (a[0]x[n], . . . , a[m−1]x[n−m+1]) are formed, and these are added, this results, from equation (2.12) in:

$$a[0]x[n] = a[0] \sum_{k=1}^{p} h_k z_k^{n-1} \quad (2.13)$$

$$a[1]x[n-1] = a[1] \sum_{k=1}^{p} h_k z_k^{n-2}$$

$$a[2]x[n-2] = a[2] \sum_{k=1}^{p} h_k z_k^{n-3}$$

$$\vdots$$

$$a[m]x[n-m] = a[m] \sum_{k=1}^{p} h_k z_k^{n-m-1}$$

$$\overline{\sum_{m=0}^{p} a[m]x[n-m] = \sum_{m=0}^{p} \left[ a[m] \sum_{k=1}^{p} h_k z_k^{n-m-1} \right]}$$

Conversion of the right-hand side of equation (2.13) results in:

$$\sum_{m=0}^{p} a[m]x[n-m] = \sum_{k=1}^{p}\left[h_k \sum_{m=0}^{p} a[m]z_k^{p-m-1}\right]. \quad (2.14)$$

The substitution $z_i^{n-m-1}=z_i^{n-p}z_i^{p-m-1}$ results in:

$$\sum_{m=0}^{p} a[m]x[n-m] = \sum_{k=1}^{p}\left[h_k z_k^{n-p}\sum_{m=0}^{p} a[m]z_k^{p-m-1}\right] = 0. \quad (2.15)$$

The polynomial from equation (2.11) can once again be seen in the right-hand part of the summation. If all of the roots $z_k$ are determined, this results in the sought zero points. Equation (2.15) is the sought linear differential equation, whose solution is equation (2.8). The polynomial (2.11) is the characteristic equation for the differential equation.

The p equations represent the permissible values for a[m] which solve equation (2.15).

$$\begin{pmatrix} x[p] & x[p-1] & x[p-2] & \cdots & x[0] \\ x[p+1] & x[p] & x(p-1) & \cdots & x[1] \\ x[p+2] & x[p+1] & x[p] & \cdots & x[2] \\ \vdots & \vdots & & \ddots & \vdots \\ x[2p-1] & x[2p-1] & x[2p-3] & \cdots & x[p] \end{pmatrix} \begin{pmatrix} a[0] \\ a[1] \\ a[2] \\ \vdots \\ a[p] \end{pmatrix} = 0 \quad (2.16)$$

There are p unknowns in equation (2.16). The matrix x comprises p+1 rows and columns. Equation (2.16) is thus over defined. In order to obtain a solution vector, the upper row in the matrix x and thus also the known coefficient a[0], is deleted, and the first column is subtracted.

$$\begin{pmatrix} x[p] & x[p-1] & \cdots & x[1] \\ x[p+1] & x[p] & \cdots & x[2] \\ \vdots & \vdots & \ddots & \vdots \\ x[2p-1] & x[2p-2] & \cdots & x[p] \end{pmatrix} \begin{pmatrix} a[1] \\ a[2] \\ \vdots \\ a[p] \end{pmatrix} = -\begin{pmatrix} x[p+1] \\ x[p+2] \\ \vdots \\ x[2p] \end{pmatrix} \quad (2.17)$$

The p unknowns can be determined with the aid of p equations.

The Prony method can thus be summarized in the form of three steps.
1. Solution of equation (2.17) ⇒ results in the coefficients of the polynomial (2.11)
2. Calculation of the roots of the polynomial equation (2.11) ⇒ results in the time-dependent parameter $z_k$ from equation (2.8) ⇒ calculation of the damping and frequency from z $$\alpha_k = \ln|z_k|/T \quad (2.18)$$

$$f_k = \tan^{-1}[Im(z_k)/Re(z_k)]/[2\pi T] \quad (2.19)$$

3. Formulation of equation (2.9) ⇒ solution based on h ⇒ calculation of the amplitude and of the phase shift $$A_k = |h_k| \quad (2.20)$$

$$\theta_k = \tan^{-1}[Im(h_k)/Re(h_k)] \quad (2.21)$$

There is no need to determine the individual parameters for estimation of the future time waveform. The "prediction" of the further waveform of the input signal is also possible with the aid of the parameters $z_k$ and $h_k$, equation (2.8) and a change to the variable n, which reflects the time period to be estimated. However, if there is a change to the time step width for the estimation process in comparison to the sampling, it is necessary to explicitly determine the damping, frequency, amplitude and phase shift parameters.

A further advantage of the Prony method for the analysis of current and/or voltage waveforms is that it can also be used for relatively high-frequency processes. The expression relatively high-frequency processes means processes which oscillate in the range between 100 and 700 Hz. The operating frequency range covers the frequencies between 24 and 100 Hz. Frequencies below 24 Hz should be regarded as low frequencies. High-frequency processes occur, for example, when switching devices are being switched. The high-frequency components are superimposed on the fundamental oscillation.

Furthermore, it is advantageously possible to provide for a modified Prony method to be used for processing of the determined voltage and/or current data.

The modified Prony method is similar to the maximum likelihood principle (Gaussian principle of least squares). The calculation process is based on a fixed p (number of exponential functions, see above). During the calculation process, an iteration method is carried out, so that the accuracy of the previously determined voltage and/or current waveforms is optimized. The degree of accuracy of the previous determination can be varied by definition of tolerance limits for the optimization process. The computation time required can thus be reduced, depending on the requirement. The modified Prony method is described in detail in Osborne, Smyth: A modified Prony Algorithm for fitting functions defined by difference equations, SIAM Journal of Scientific and Statistical Computing, Vol. 12, 362-382, March 1991. The modified Prony method is insensitive to "noise" from the voltage and/or current data determined from the electrical power supply system. "Noise" such as this is unavoidable when using actual components to determine the voltage and/or current data. Interference such as this can be minimized only with an unacceptably high degree of complexity. The robustness against "noise" on the input signals makes it possible to use low-cost test equipment to determine the present voltage and/or current data in the electrical power supply system when using the modified Prony method.

In another embodiment of the invention, there is an apparatus which has a device for automated processing of the voltage and/or current data using the Prony method.

Since the processes under consideration are carried out in intervals of a few milliseconds, it has been found to be advantageous to use an apparatus with a device for automated processing of the voltage and/or current data. In order to carry out this automated processing particularly quickly, it is possible to provide for the device for automated processing to be hard-wired programmed. Circuits such as these are known as application specific integrated circuits "ASICs". However, if a sufficiently fast device for automated processing is available, then they may be in the form of programmable logic. Programmable devices such as these for automated processing can easily be matched to changing boundary conditions by reprogramming.

BRIEF DESCRIPTION OF THE DRAWINGS

The invention will be explained in more detail in the following text, and is illustrated with reference to exemplary embodiments in the drawings, in which:

FIG. 1 shows an electrical circuit breaker and an apparatus having a device for automated processing.

DETAILED DESCRIPTION OF THE INVENTION

FIG. 1 shows a section through a schematically illustrated high-voltage circuit breaker 1. The high-voltage circuit breaker 1 has encapsulation 2 in which an interrupter unit 3 for the high-voltage circuit breaker 1 is arranged. The interrupter unit 3 for the high-voltage circuit breaker 1 is connected to an electrical power supply system 5 by means of high-voltage bushings 4a, b. The electrical power supply system 5 may, for example, be an overhead line power supply system for transmitting electrical power from a power station 7 to a consumer 8. A first measurement apparatus 9 is arranged upstream of the high-voltage circuit breaker 1 in the power flow direction. A second measurement apparatus 10 is arranged downstream from the high-voltage circuit breaker 1 in the power flow direction. The first measurement apparatus 9 and the second measurement apparatus 10 may, for example, comprise current transformers and voltage transformers as well as further apparatuses. It is also possible to provide for only one of the two measurement apparatuses 9, 10 to be used. The data which is determined by the first and by the second measurement apparatuses 9, 10, for example voltage and/or current data, is transmitted to an apparatus 11. The apparatus 11 has device 11a for automated processing of the voltage and/or current data. The device 11a for automated processing may, for example, be hard-wired programmed controllers or programmable logic controllers, which carry out the general Prony method and/or the modified Prony method. The apparatus 11 may also be provided with a signal output 11b which acts directly or with the interposition of further apparatuses (which are not illustrated) on a drive unit 12, which results in the switching movement of the interrupting unit 3 at a specific time, for example before a voltage or current zero crossing, or at some other suitable time. This switching movement may, for example, be a connection or a disconnection movement.

What is claimed is:

1. A method for determining a switching time for an electrical switch in an electrical power supply system, comprising:
   determining a present voltage and/or current data at various times in the electrical power supply system;
   processing the determined voltage and/or current data by way of a Prony method and taking into account transient processes and irregularities in a periodicity of the system;
   predicting a behavior of the voltage waveform and/or current waveform based on the processed voltage and/or current data; and
   determining a switching time for the electrical switch based on the predicted behavior of the voltage waveform and/or current waveform.

2. An apparatus for determining a switching time for an electrical switch in an electrical power supply system, comprising:
   a device for automated processing of a voltage and/or current data, wherein the device is configured to:
   determine the voltage and/or the current data at various times in an electrical power supply system,
   process the determined voltage and/or the current data by way of a Prony method, thereby taking into account transient processes and irregularities in a periodicity of the system;
   predict a behavior of the voltage waveform and/or current waveform based on the processed voltage and/or current data; and
   determine a switching time for the electrical switch in the power supply system based on the predicted behavior of the voltage waveform and/or current waveform.

* * * * *